(12) United States Patent
Maile et al.

(10) Patent No.: US 7,021,864 B2
(45) Date of Patent: *Apr. 4, 2006

(54) SOIL BINDING AND REVEGETATION COMPOSITIONS AND METHODS OF MAKING AND USING SUCH COMPOSITIONS

(75) Inventors: Richard L. Maile, Midvale, UT (US); John Williams, South Jordan, UT (US); Terry R. Holmes, Draper, UT (US)

(73) Assignee: Sequoia Pacific Research Company, LLC, Draper, UT (US)

( * ) Notice: Subject to any disclaimer, the term of this patent is extended or adjusted under 35 U.S.C. 154(b) by 5 days.

This patent is subject to a terminal disclaimer.

(21) Appl. No.: 10/767,549

(22) Filed: Jan. 29, 2004

(65) Prior Publication Data

US 2005/0111924 A1    May 26, 2005

Related U.S. Application Data

(63) Continuation-in-part of application No. 10/723,999, filed on Nov. 26, 2003.

(51) Int. Cl.
  *E02D 3/12*   (2006.01)
  *C09K 17/50*  (2006.01)

(52) U.S. Cl. ............... 405/128.5; 405/264; 106/134.1; 252/88.1

(58) Field of Classification Search ............. 405/128.5, 405/128.75, 263, 264; 106/900, 134.1; 252/88.1
  See application file for complete search history.

(56) References Cited

U.S. PATENT DOCUMENTS

| | | | |
|---|---|---|---|
| 2,978,312 A * | 4/1961 | Seymour ................... 71/33 |
| 3,131,074 A | 4/1964 | Thompson |
| 3,681,246 A | 8/1972 | Lewer et al. |
| 3,763,072 A * | 10/1973 | Krieger ................... 523/132 |
| 3,896,039 A | 7/1975 | Jacoby |
| 3,907,538 A * | 9/1975 | Hauschild ................ 71/34 |
| 4,038,443 A | 7/1977 | Jacoby |
| 4,560,400 A * | 12/1985 | Allan et al. ............... 71/29 |
| 4,575,391 A | 3/1986 | DeBoodt et al. |
| 4,801,635 A | 1/1989 | Zinkan et al. |
| 5,129,936 A * | 7/1992 | Wilson ................... 71/63 |
| 5,480,584 A | 1/1996 | Urano et al. |
| 5,514,222 A | 5/1996 | Williams |
| 5,658,486 A | 8/1997 | Rogers et al. |
| 5,897,698 A | 4/1999 | Bellas |
| 6,042,305 A * | 3/2000 | Novich et al. ............ 405/266 |
| 6,083,891 A | 7/2000 | Hodges |
| 6,432,166 B1 | 8/2002 | Olafson et al. |
| 6,589,442 B1 | 7/2003 | Wilson et al. |
| 6,777,465 B1 * | 8/2004 | Haile ................... 524/47 |
| 6,790,245 B1 | 9/2004 | Wolff et al. |
| 2003/0108668 A1 | 6/2003 | Joedicke |

FOREIGN PATENT DOCUMENTS

| | | |
|---|---|---|
| EP | 0274804 | 7/1988 |
| JP | 56164104 | 12/1981 |
| JP | 11011993 | 1/1999 |
| JP | 11061120 A * | 3/1999 |
| JP | 2002068879 A * | 3/2002 |
| JP | 2004141147 A * | 5/2004 |

* cited by examiner

*Primary Examiner*—Michael Safavi
*Assistant Examiner*—Gay Ann Spahn
(74) *Attorney, Agent, or Firm*—Workman Nydegger

(57) ABSTRACT

Soil binding and revegetation compositions useful for stabilizing soil and promoting vegetation or revegetation of soil comprise water, an endosperm, an iron compound, a strong base, and a fibrous material comprising at least two different types of fibers. The endosperm comprises the carbohydrate and protein portions of grains, seeds, or tubers. The strong base is reacted with the endosperm in the presence of water added in order to ionize the carbohydrate and protein of the endosperm and render them more soluble or dispersible in water. The iron compound promotes an electrochemical reaction that assists in the formation of a silicate crystal matrix when applied to soil. The fibrous material comprises at least two different types of fibers that promote adhesion to soil and soften and nourish the soil in order to promote the emergence of plant life and/or seed germination. Seeds may optionally be added to further promote vegetation or revegetation of denuded soils. A pH adjustor may be added to lower the pH of the soil binding and revegetation composition in order to improve handling ability and render the composition more compatible with soil.

45 Claims, No Drawings

SOIL BINDING AND REVEGETATION COMPOSITIONS AND METHODS OF MAKING AND USING SUCH COMPOSITIONS

CROSS-REFERENCE TO RELATED APPLICATION

This application is a continuation-in-part of co-pending U.S. application Ser. No. 10/723,999, filed Nov. 26, 2003. The foregoing application is incorporated herein in its entirety.

BACKGROUND OF THE INVENTION

1. The Field of the Invention

The invention is in the field of soil treatment compositions useful in soil remediation, particularly those useful in binding soil in order to inhibit dust formation and erosion of denuded soil and also in promoting the growth of vegetation. The invention also relates to the manufacture and use of such compositions.

2. The Relevant Technology

Denuding of soil can result from various natural and man-made forces, examples of which include forest fires, brush fires, land slides, avalanches, mining, and grading of land (e.g., during the building of roads, bridges, buildings, and other man-made structures). Soil that is devoid of vegetation is vulnerable to erosion, which can be caused by wind and/or water. Erosion can result in long-term ecological damage and can pose a risk to wildlife and humans.

One strategy to remediate denuded land is to plant new shrubbery or broadcast plant seeds that can quickly germinate in order to provide a root system that better stabilizes the soil. In addition, plants can also provide a barrier from wind and water, help maintain soil moisture, add organic matter to the soil, and provide food and shelter for animals, insects, microorganisms, and other life forms.

Sometimes, however, simply revegetating land by dropping seeds on denuded land is not effective, especially where the soil is quickly eroded by wind and water before the plants have germinated and become well established, or where the soil is simply too dry to cause seeds to germinate or support newly germinated plants. In some cases, plant matter (such as straw or mulch) is placed on the soil surface in an effort to stabilize soil and/or aid in moisture retention and seed germination. This strategy, though helpful in some cases, is not very effective in stabilizing dry soil from the effects of wind or sudden rain storms since the plant material is generally only loosely placed onto the soil surface. Without intimate mixing of the plant material with the soil being treated, there is little or no mechanical affinity of the soil for the plant material.

In view of the foregoing, there is therefore an ongoing need to develop improved compositions and methods that can be employed in order to bind and stabilize soil and other particles in order to, e.g., prevent erosion, provide a more stable soil surface, and facilitate vegetation or revegetation of the soil.

SUMMARY OF THE INVENTION

The present invention relates to soil binding and revegetation compositions that can be applied to soil in order to stabilize it and promote revegetation thereof. In one aspect of the invention, soil binding and revegetation compositions according to the invention can be applied to soil in order to bind the soil particles together so as to reduce wind and/or water erosion. In another aspect, the compositions can assist in the vegetation or revegetation of denuded land.

The soil binding and revegetation compositions according to the invention comprise water, an endosperm, an iron compound, a strong base, and a fibrous material. A precursor composition comprising the non-aqueous components may be included in one or more initially separate parts that are mixed together in the presence of water in a desired mixing sequence.

The endosperm comprises the carbohydrate and protein portions of grains, seeds, or tubers. Examples of endosperm sources that may be used in the soil binding and revegetation compositions of the invention include, but are not limited to, cereal grains (e.g., wheat, rice and corn), other seeds (e.g., soy beans), and tubers (e.g., potatoes). The "endosperm" portion within any given soil binding and revegetation composition may come from a single source or from multiple sources. Animal protein can also be mixed with a carbohydrate (and also a protein, if desired) from a plant source in order to yield a synthetic endosperm.

The iron compound is believed to promote an electrochemical reaction that assists in the formation of a silicate crystal matrix when the soil binding and revegetation composition is applied to soil. Examples of iron compounds that may be used in the compositions of the invention include, but are not limited to, ferric oxide and ferrous oxide.

The strong base is reacted with the endosperm in the presence of water added in order to ionize the carbohydrate and protein of the endosperm and render them more soluble or dispersible in water. Examples of strong bases that may be used in the soil binding and revegetation compositions of the invention include, but are not limited to, sodium hydroxide, potassium hydroxide, and mixtures thereof. The use of a strong base results in an intermediate composition that has a strongly alkaline pH.

The fibrous material within the soil binding and revegetation compositions of the invention results in a soil surface that is softer and more compatible with newly germinated seeds and emerging plants. The fibrous material acts to insulate the soil and maintain moisture therein. Exemplary fibrous materials include coarser fibers, such as thermally processed wood fibers, and more highly processed fibers, such as recycled paper (e.g., newsprint) fibers. In a preferred embodiment, a mixture of coarser and more highly processed fibers are used. More highly processed fibers help the composition better adhere to soil, retain moisture over time, and control drift in the case of aerial application. Coarser fibers help create a softer fibrous matrix that facilitates the emergence of newly sprouted seeds and plants through the treated soil.

Optional components such as seeds can be added to further promote vegetation or revegetation of denuded soils. Adding seeds to this composition is a preferred alternative embodiment. Nutrients and other adjuvents may be added as desired to yield particle binding compositions having desired properties.

A pH adjustor may also be added in order to lower the pH and alkalinity of the soil binding and revegetation composition, which improves its handling ability and renders the composition more compatible with soil. Examples of pH adjustors that may optionally be used in the compositions of the invention include, but are not limited to, strong acids, such as sulfuric acid, sulfamic acid and nitric acid, and weak acids, such as formic acid, acetic acid and citric acid. The use of weak acids improves handling ability.

These and other advantages and features of the present invention will become more fully apparent from the following description and appended claims, or may be learned by the practice of the invention as set forth hereinafter.

DETAILED DESCRIPTION OF THE PREFERRED EMBODIMENTS

I. Introduction and Definitions

The present invention relates to soil binding and revegetation compositions and methods for treating soil using such compositions. Such compositions effectively bind soil particles together in order to prevent erosion of the soil by wind, water and other environmental forces. They also provide a fibrous material that acts as a mulch to prepare the soil and promote vegetation or revegatation thereof. The soil binding and revegetation compositions can also be used to bind other particles found on or in the vicinity of soil, examples of which include ash (e.g., from forest fires, brush fires or other burn sites) and powders resulting from mining, the grinding of rock or other industrial or building operations, and overburden and tailings from mining operations. Such other particles, when treated with compositions according to the invention, can turn into soil that can support plant life.

Compositions of the invention are believed to operate at a nano level when binding particles together. Without being bound to any particular theory as to how the soil binding and revegetation compositions according to the invention actually work to bind soil and other particles together, it is believed that the inventive compositions, when applied to soil, create ionic charges through an electrochemical reaction which pull together silicate particles naturally found in soil so as to form a silicate crystal matrix comprising silicate particles (nano-, micro- and macro-silicate particles) and one or more constituents within the inventive compositions. This matrix causes molecular Binding of the soil particles. The matrix appears to have the capability of re-actuating multiple times through rehydration of the soil and the soil binding and revegetation composition already applied thereto.

The recurring actuations of the silicate crystal matrix create a mechanical particle and soil binder that is able to stabilize soil and other particles. For example, the compositions are useful in creating a binding matrix to stabilize ash (or ash and soil) in a post-fire environment. They help prevent or inhibit wind and water erosion. Compositions according to the invention can be formulated so as to assist in moisture retention. They can aid in enhanced seed germination and plant growth through the dual action of soil stabilization and moisture retention.

The terms "solid component" and "solid components" shall refer to any component that is, or that is capable of being, in a solid state at room temperature prior to being mixed with water. The terms "solid component" and "solid components" shall collectively refer to any component within a soil binding and revegetation composition that is in a solid state, that is in a dissolved state, that is in the form of a colloid or colloidal dispersion, that is in the form of a suspension, or that is or can be otherwise dissolved, dispersed, suspended, or otherwise mixed with water as part of a particle binding composition.

Prior to being mixed with water, the "solid components" and any other components other than water may be referred to as a "precursor composition". One or more portions or subsets of the "precursor composition" can be dry-mixed and/or mixed with water prior to adding the remaining portions or subsets of the "starting composition" in order to form an "intermediate composition".

The "weight" of a "solid component" shall be understood as the weight of the component exclusive of any added water, but including any "bound water" that is naturally or normally associated with that component. The term "bound water" shall be given its ordinary meaning, and typically refers to water that is difficult to remove without extreme or special drying procedures.

II. Soil Binding and Revegetation Compositions

The soil binding and revegetation compositions according to the invention include various components that work together to bind soil particles together and prepare the soil so as to promote vegetation or revegetation thereof. Without being bound by any particular theory, it is believed that one or more components within the particle binding compositions promote the aforementioned electrochemical reaction that attracts small particles together so as to form a particle binding matrix (e.g., a silicate crystal matrix). The particle binding matrix acts to bind and stabilize soil particles together. The fibrous material, preferably comprising at least two different types of fibers (e.g., a more highly processed fiber and a coarser fiber), promotes adhesion of the composition to soil and moisture retention, controls drift during aerial application, and promotes the emergence of newly sprouted seeds or plants through the treated soil.

The soil binding and revegetation compositions according to the invention are aqueous compositions that comprise water, an endosperm, an iron compound, a strong base, and a fibrous material. The endosperm, iron compound, strong base, and fibrous material comprise "non-water constituents" and may exist in a non-aqueous form in one or more parts prior to being mixed with water to form a soil binding and revegetation composition according to the invention. The endosperm, iron compound, strong base, and fibrous material are typically solid prior to being added to water and collectively comprise "solid components" and "initially solid components".

After being mixed with water, the initially solid components may be in the form of a solution, a colloidal dispersion, a suspension, or a combination thereof (e.g., one or more of the initially solid components may form an aqueous solution, while one or more components may form a colloidal dispersion and/or suspension within the aqueous solution). The total amount of initially solid components added to water to form the soil binding and revegetation composition will typically vary the specific gravity of the mixture at 25° C. within a range of about 1.01 to about 1.75, preferably within a range of about 1.015 to about 1.5. Varying the ratio of water and solid components also affects the viscosity of the composition.

A. Endosperm

The constituent within the soil binding and revegetation compositions of the invention that is the binder primarily responsible for binding soil particles together is the endosperm. The term "endosperm" is commonly understood as the carbohydrate and protein portion of grains and other seeds. In some embodiments, the source of endosperm used to form soil binding and revegetation compositions according to the invention may comprise a pure or substantially pure endosperm fraction of a grain or other seed (e.g., a grain from which the husk, bran and germ have been removed). In other embodiments, the endosperm may be provided in a non-purified or less purified form in combination with other constituents of the grain or other seed that provides the source of endosperm.

In yet other embodiments, the carbohydrate and protein constituents of the "endosperm" may be provided or extracted from one or more different types of grain, seeds, or other plant sources (e.g., tubers). For example, some or all of the carbohydrate can be provided from one source (e.g., corn, wheat, or potato starch) and some or all of the protein can be provided by another source (e.g. corn, wheat, or even animal protein). As such, the "endosperm" need not contain a carbohydrate and protein in a ratio corresponding to any one particularly grain, seed or other plant source. Nor must the carbohydrate and protein come from any particular source so long as both are present in the soil binding and revegetation composition. In other words, the term "endosperm", as used in the present application and appended claims, unless otherwise specified, shall include both natural and synthetic "endosperms" comprising (1) at least one type of carbohydrate and/or having at least one carbohydrate source, be it grain, other seeds, tubers, or other plant sources, and (2) at least one type of protein and/or having at least one protein source, be it grain, other seeds, tubers, other plant sources, or even animal sources.

Examples of endosperm sources include grains, examples of which include wheat, rice, corn, oats, barley, rye, sorghum, millet, other cereal grains, soy beans, pinto beans, black beans, other legumes, sesame seeds, other seeds, tubers, examples of which include potatoes and arrowroot, and other plant sources. Although not ordinarily understood to be a source of endosperm, animal protein can be blended with one or more types of plant-derived carbohydrate and, optionally, one or more types of plant-derived protein, to form a synthetic "endosperm" within the scope of the invention. A currently preferred source of endosperm is wheat flour (whole or bleached, edible or non-food grade).

The endosperm is preferably included in an amount in a range of about 25% to about 95% by weight of the solid components (exclusive of added water) within soil binding and revegetation (or precursor) compositions according to the invention, more preferably in a range of about 50% to about 85% by weight of the solid components, and most preferably in a range of about 60% to about 75% by weight of solid components.

B. Iron Compound

Without being bound by any particular theory, it is believed that the iron compound is the constituent within the particle binding compositions of the invention that causes, promotes, or is at least involved in what is believed to be an electrochemical reaction that occurs at a nano level in water in order to form, or promote the formation of, a particle binding matrix (e.g., a silicate crystal matrix). More particularly, it is believed that the iron ions ($Fe^{+2}$ and/or $Fe^{+3}$) within the iron compound cause, promote, or are at least partially involved in an electrochemical reaction in water between the soil binding and revegetation compositions according to the invention and silicate or other particles within the soil that promotes the formation of a particle binding matrix. Empirical observations suggest that the particle binding matrix (e.g., silicate crystal matrix) can be re-actuated multiple times upon rewetting or rehydration of the soil or particles to which soil binding and revegetation compositions according to the invention have been applied.

Iron compounds are typically colored, especially at an elevated pH at which many iron compounds are converted to iron oxide in the present of water. As such, another purpose of the iron compound is to act as a dye or pigment within the soil binding and revegetation compositions of the invention. In the absence of the iron compound (or other dye or pigment), the soil binding and revegetation composition is typically clear or white. Iron oxide is able to impart a rusty (e.g., red, orange, or yellow) hue, depending on the concentration and/or oxidation state of the iron ions. In some cases, the iron compound can act as a color marker in order to show where and/or how heavy the soil binding and revegetation composition has been applied. In other cases, the iron compound may causes the soil binding and revegetation composition to have a more natural hue or tone relative to the soil to which it is applied (e.g., where the soil binding and revegetation composition would otherwise be white and the soil to be treated is not white).

Examples of iron compounds that may be used to form soil binding and revegetation compositions within the scope of the invention include, but are not limited to, iron oxide (e.g., ferrous oxide, ferric oxide, or mixtures or alloys thereof), iron halides (e.g., ferric chloride), iron hydroxide, iron sulfates (e.g., ferric sulfate, ferric subsulfate, ferrous sulfate), and iron nitrates. The iron compound may be formed in situ through a reaction between an iron source (e.g., reduced iron metal powder) and one or more constituents within the soil binding and revegetation composition (e.g, water, entrained or available oxygen, hydroxide ion, etc.). A currently preferred iron compound is ferric oxide ($Fe_2O_3$).

The iron compound is preferably included in an amount in a range of about 0.01% to about 5% by weight of the solid components (exclusive of added water) within soil binding and revegetation (or precursor) compositions according to the invention, more preferably in a range of about 0.1% to about 1% by weight of the solid components, and most preferably in a range of about 0.25% to about 0.5% by weight of solid components.

C. Strong Base

It is believed that at least one purpose or function of the strong base is to cause or allow the ionization of the endosperm when the strong base and endosperm are mixed with water. In one aspect, ionization of the endosperm allows or causes it to be more thoroughly dissolved or dispersed within the water used to form the soil binding and revegetation composition. In another aspect, and without being bound to any particular theory, ionization of the endosperm is believed to cause or allow the endosperm to participate in the electrochemical reaction in water between the soil binding and revegetation composition and silicate or other particles within soil in order to form the particle binding matrix (e.g., silicate crystal matrix).

The strong base may, in some cases, also cause or promote hydrolysis of the carbohydrate and/or protein in the presence of water depending on the mixing conditions, including the amount of time between the addition of the strong base and the pH adjustor. In general, increasing the mixing time before adding the pH adjustor and/the or vigorousness of the mixing process tends to increase the tendency of the carbohydrate and/or protein to become hydrolyzed. Hydrolyzing at least some of the carbohydrate and/or protein may alter the viscosity of the soil binding and revegetation composition and/or the reactivity and ability to bind of the endosperm with silicates or other particles within the soil.

Examples of strong bases that may be used to form soil binding and revegetation compositions according to the invention include alkali metal oxides (e.g., sodium oxide and potassium oxide), alkali metal hydroxides (e.g, sodium hydroxide and potassium hydroxide), alkaline earth metal oxides (e.g., calcium oxide), alkaline earth metal hydroxides (e.g., calcium hydroxide), ammonium hydroxide (i.e., aqueous ammonia), and alkali metal carbonates (e.g., sodium carbonate and potassium carbonate). Currently preferred strong bases include sodium hydroxide, potassium hydroxide, and mixtures thereof.

The strong base is added in an amount in order to raise the pH to above 13, typically at or above 13.2. As such, the strong base is preferably included in an amount in a range of about 5% to about 75% by weight of by weight of the solid components (exclusive of added water) within soil binding and revegetation (or precursor) compositions according to the invention, more preferably in a range of about 15% to about 50% by weight of the solid components, and most preferably in a range of about 25% to about 40% by weight of solid components.

D. Fibrous Material

The fibrous material is included in order for the soil binding and revegetation compositions of the invention to be assist in the vegetation or revegetation of soil (e.g., in the case where soil has been denuded by fire or newly graded using earth moving equipment). The fibrous material acts to soften and enrich the soil so as to create a more fertile and friendly environment for the planting of vegetation and/or the emergence of newly sprouted seeds. The fibrous component may also control drift caused by air turbulence in aerial applications, and it insulates and maintains moisture within the soil.

Examples of fibrous materials that may be added to the soil binding and revegetation compositions according to the invention include wood and plant fibers, polymeric fibers, mineral fibers, wood chips, saw dust, and recycled paper (e.g., recycled newsprint). In a preferred embodiment, the fibrous component includes a mixture of coarser fibers, such as thermally processed wood fibers, and more highly processed fibers, such as recycled paper (e.g., recycled newsprint). The term "thermally processed wood fibers" refers to fibers that have been exposed to blowing steam and combed, which results in increased surface area and water absorption capability.

More highly processed fibers promote adhesion of the soil binding and revegetation compositions to soil, help to retain moisture, and help control drift of the composition during aerial application (i.e., it helps the composition drift and spread out more evenly over a larger area). More highly processed fibers and characterized by fibers that have been more severely processed from a chemical standpoint, mechanical standpoint, or both, so as to have weaker, shorter and/or more splintered or frayed fibers. In some cases, the cellulose and hemicellulose constituents within more highly processed fibers have been partially broken down from a chemical standpoint. In general, more highly processed fibers are characterized as having significant to substantial physical and structural breakdown of the fiber shaft. Examples of more high processed fibers include, but are not limited to, recycled paper, recycled newsprint, partially digested wood or plant fibers, and chemically pulped wood or plant fibers.

Coarser fibers promote or facilitate the emergence of newly sprouted seeds or plants. In the absence of coarser fibers, more highly processed fibers such as recycled newsprint have a tendency to form a strong fibrous matrix that can inhibit the emergence of newly sprouted seeds and plants. Adding coarser fibers to the more highly processed fibers breaks up or softens the fibrous matrix, which promotes or facilitates the emergence of newly sprouted seeds or plants through the treated soil. In general, coarser fibers are characterized as having little or no significant physical and structural breakdown of the fiber shaft. Examples of coarser fibers include, but are not limited to, thermally processed wood fibers, other types of wood and plant fibers (e.g., southern pine, southern hardwood, staple fibers, hemp, cotton, sisal, abaca, bagasse, and the like), synthetic fibers (e.g., polyester, nylon, polyolefin, polycarbonate, and other polymers), and inorganic fibers (e.g., glass, graphite, silica, ceramic, metal, rock wool, and the like).

The strong base, iron oxide and endosperm may, in some cases, promote the breakdown of the fibrous material, particularly cellulose and wood fiber materials. This creates an increased solid suspension in the liquid matrix. A homogeneous-like suspension created by the aqueous mixture of endosperm, iron oxide and strong base reduces solids separation that may otherwise be caused by the gravitational differences of weight when the soil binding and revegetation composition is dropped from an aircraft during aerial application.

The fibrous component is preferably included in an amount in a range of about 0.1% to about 25% by weight of the water within the soil binding and revegetation composition, more preferably in a range of about 1% to about 10% by weight of the water within the soil binding and revegetation, and most preferably in a range of about 2.5% to about 5% by weight of the water within the soil binding and revegetation composition.

The fibrous component will preferably include a weight ratio of more highly processed to coarser fibers in a range of about 1:20 to about 20:1, more preferably in a range of about 1:5 to about 7:1, and most preferably in a range of about 2:3 to about 3:1.

E. Water

Water is added in order to activate the various components within the soil binding and revegetation composition and also to provide a vehicle that allows the components within the composition to be applied to soil. In one aspect, water causes or allows the strong base to react with and ionize the endosperm. In another aspect, water causes the fibrous material to form a suspension within the composition. In the case where a pH adjustor is included, the water causes or allows the strong base and pH adjustor to react in order to reach a desired pH equilibrium. Water may be responsible for causing or allowing one or more constituents within the particle binding composition to carry out the electrochemical reaction with silicate particles within the soil in order to create the silicate crystal matrix.

The amount of water that is included within the soil binding and revegetation compositions according to the invention may be varied as desired to yield compositions having desired properties and concentrations of the components dissolved or dispersed therein. The amount of water relative to the initially solid components affects the viscosity and soil particle binding ability of the final aqueous soil binding and revegetation composition. Increasing the solids content generally increases the viscosity and binding ability of the composition.

In some embodiments, the desired amount of water within the final soil binding and revegetation composition is added all at once. In other embodiments, soil binding and revegetation compositions according to the invention may be produced in concentrated form using a first quantity of water and then diluted prior to use using a second quantity of water. The water can be fresh or brackish. It may comprise non-potable water suitable for irrigation.

The water within soil binding and revegetation compositions according to the invention will preferably be included in an amount in a range of about 60% to about 99.9% by weight of the soil binding and revegetation composition, more preferably in a range of about 75% to about 99.5% by weight of the soil binding and revegetation composition, and most preferably in a range of about 90% to about 99% by weight of the soil binding and revegetation composition.

F. Optional Components

The particle binding compositions according to the invention may optionally include other components as desired to yield compositions having desired properties. Examples of optional components that may be added include, but are not limited to, pH adjustors, pigments, dyes, soil nutrients, fertilizers (e.g., chemical and organic), auxiliary binders (e.g., synthetic polymers, clay, and hydraulic cement), wetting agents, surfactants (e.g., salts of fatty acids, sulfonates, and organic sulfates), humectants (e.g., ethylene glycol, polyethylene glycol, propylene glycol, polypropylene glycol, other glycerin, or other polyols).

In order to promote faster vegetation or revegetation of denuded soil, one or more types of seeds may be included within the soil binding and revegetation compositions according to the invention. In order to promote a natural looking environment, a mixture of seeds for plants native to a particular region or tract of land being treated may be added to the particle binding composition.

A pH adjustor may optionally be added in order to adjust the pH and make the soil binding and revegetation compositions according to the invention safer for handling and/or more pH balanced relative to soil particles to which it is applied. Providing compositions that are pH balanced makes them more compatible with microorganisms found within the soil, and optionally with seeds or other revegetation-promoting materials within the soil binding and revegetation compositions.

Because the purpose of the pH adjustor, when optionally included, is to lower the otherwise high pH caused by the addition of the strong base, the pH adjustor will typically be an acid or acid buffer that is able to lower the pH of the soil binding and revegetation composition. In one embodiment, it may be advantageous to add the pH adjustor after adding the strong base in order to allow the strong base to react with and ionize (and optionally hydrolyze) the endosperm to a desired extent prior to adding the pH adjustor. In such cases, the composition that is formed prior to adding the pH adjustor to yield a particle binding composition according to the invention may be considered to be an "intermediate composition".

The pH adjustor can be any strong or weak acid, including mineral acids, organic acids, acid buffer salts, and the like. Examples of useful mineral acids that may be used as the pH adjustor include, but are not limited to, sulfuric acid, sulfamic acid, hydrochloric acid, nitric acid, and phosphoric acid. Examples, of useful organic acids that may be used as the pH adjustor include, but are not limited to, carbonic acid (i.e., carbon dioxide dissolved in water), formic acid, acetic acid, propanoic acid, benzoic acid, oxalic acid, glycolic acid, citric acid, and ascorbic acid. Examples of useful acid buffer salts include bisulfates, metal chlorides (e.g., aluminum chloride), and other conjugate salts of strong acids and weak bases. Currently preferred strong acid pH adjustors include sulfuric acid and sulfamic acid. A currently preferred weak acid, which is also an organic acid, is citric acid. Weak acids are advantageous in that they improve handling ability and/or do not form localized hot spots if mixed in concentrated form with small quantities of water in the same way that strong acids can.

The amount of pH adjustor that is optionally added to the intermediate composition to yield a more pH balanced soil binding and revegetation composition according to the invention will depend on the strength of the pH adjustor relative to the pH of the intermediate composition prior to adding the pH adjustor, as well as the desired pH of the soil binding and revegetation composition. For example, strong acids such as sulfuric and nitric acid will have a greater pH adjusting (i.e., lowering) affect than weak acids or acid buffer salts. More than one pH adjustor may be used if desired.

The pH adjustor, when included, will preferably be included so as to result in a soil binding and revegetation composition having a pH in a range of about 9 to about 13, more preferably so as to have a pH in a range of about 10 to about 12.8, and most preferably so as to have a pH in a range of about 10.5 to about 12.6.

III. Methods of Making Soil Binding and Revegetation Compositions

The various components within the soil binding and revegetation compositions of the present invention can be blended in any desired manner in order to yield compositions having desired properties. In one currently preferred method of mixing together the components, the endosperm and iron compound are initially dry mixed together in the form of dry powders or particulates using a shear-type mixer. Creating a well-mixed dry mixture of endosperm and the iron compound is believed to assist in the electrochemical reaction(s) discussed herein and accelerate the reaction between the endosperm and strong base. In many cases, the extent of mixing can be monitored by observing the extent to which the iron compound has colored or stained the endosperm. The typical duration for the initial dry mixing step is about 3–5 minutes.

After the endosperm and iron compound have been dry mixed together, a container or vessel is filled with a desired quantity of fresh or brackish water. Because the soil binding and revegetation composition is intended for application to soil, it is generally not necessary for the water to be sterile or potable. For example, non-potable water suitable for irrigation can be employed. The dry mixture of endosperm and iron oxide is added to the vessel and mixed to form a substantially uniform suspension of endosperm and the iron compound within the water. The duration of this mixing step is typically about 3–5 minutes using aggressive agitation.

While continuing to agitate the suspension, the strong base is added to the mixture, which is stirred for about 3–5 minutes in order for the reaction between the endosperm and strong base to occur. This yields an intermediate composition having a pH of about 13.2 or more. The fibrous material is then mixed with the intermediate composition for 1–10 minutes to yield the soil binding and revegetation composition according to the invention. The soil binding and revegetation composition so formed can be used as desired to bind soil and promote vegetation or revegatation thereof.

A pH adjustor may optionally be added to adjust the pH of the soil binding and revegetation composition to a desired pH or within a desired pH range. The optional pH adjustor can be added before or after addition of the fibrous material, and is stirred for about 3–5 minutes.

A composition especially suitable for promoting vegetation or revegetation of denuded soil can be prepared by adding one or more types of seeds. Seeds order to yield a composition that more quickly results in the emergence of plant life from the treated soil. In order to better reflect the natural flora of a particular tract of land, seeds of plants that are native to the area may be advantageously selected and added to the soil binding and revegetation composition.

IV. Methods of Using Soil Binding and Revegetations Compositions

The soil binding and revegetation compositions according to the invention may be applied to soil in any manner known in the art. For example, the soil binding and revegetation compositions may be applied to the soil surface by means of industry standardized hydraulic pumping equipment or through aerial dispersing (e.g., especially by rotor wing or fixed wing aircraft).

Aerial spraying or broadcasting is suitable when applying a particle binding composition to large areas and/or steep terrain. In the case of dirt roads, fields, parks, or other relatively flat surfaces, the soil binding and revegetation composition can be applied by hydraulic spraying equipment, such as water trucks and manually or mechanically held nozzles.

When the soil binding and revegetation composition is applied to soil it is buffered by the natural mineral components found naturally within the soil, typically to a more neutral pH of about 9–10. A reduction in pH to a more neutral pH assists in the survival of soil bacteria, fungi and assists in the initial breakdown of many organic materials used in the bacteriological soil food chain.

The soil binding and revegetation compositions can be applied to any desired soil or mass of particles in order to agglomerate or bind the soil or other particles together and promote vegetation or revegetation of the soil or particles. Examples of denuded soils to which the soil binding and revegetation binding compositions of the invention can be applied include, but are not limited to, denuded soil resulting from, e.g., forest fires, brush fires, other burn sites, land slides, avalanches, grading of land (e.g., during the building of roads, bridges, buildings, and other man-made structures). Other particles to which the soil binding and revegetation binding compositions of the invention may be applied include, but are not limited to, ash resulting from fires or industrial operations, powders resulting from the grinding of rock or other industrial or building operations, and overburden and tailings from mining operations. The soil binding and revegetation contain ingredients, as discussed herein, that promote vegetation or revegetation of topsoil or particles that can become soil under the right conditions (e.g., mining reclamation).

The soil binding and revegetation compositions according to the invention will typically dehydrate as a result of the natural evaporation process of soil and rehydrate as a result of natural precipitation or the application of water by irrigation. Rewetting of the soil binding and revegetation composition causes the composition to be re-actuated in order to rebind particles that may have been dislodged or separated from the binding matrix over time.

V. Examples of the Preferred Embodiments

The following examples are provided in order to illustrate soil binding and revegetation compositions according to the invention. It should be understood that the following examples are given by way of example only, and should not be understood as in any way limiting the scope of the invention.

EXAMPLE 1

Aqueous soil binding and revegetation compositions were manufactured by mixing together the following components:

| | |
|---|---|
| Endosperm (wheat flour) | 100 lbs. |
| Iron oxide ($Fe_2O_3$) | 0.5 lb. |
| Sodium Hydroxide | 25 lbs. |
| Potassium Hydroxide | 25 lbs. |
| Water | 8340 lbs. (1000 gallons) |
| Fibrous Material | 250–375 lbs. |

The endosperm and iron oxide were dry-mixed together for 3–5 minutes using a shear-type mixer in order to ensure more even dispersion of the iron oxide in the final composition. Associating the iron oxide with the endosperm was believed to assist in causing or promoting an electrochemical reaction between the soil binding and revegetation composition and silicate particles within soil to which the composition is applied. Thereafter, the endosperm and iron oxide mixture was added to a vessel containing the water (either fresh or brackish water) and mixed for 3–5 minutes using strong agitation in order to form a suspension of endosperm and iron oxide within the water.

Thereafter, the sodium hydroxide and potassium hydroxide were added to and mixed with the suspension for 3–5 minutes in order to react with and ionize the endosperm. It is believed that the iron oxide also reacted or associated with the endosperm as a result of the water and hydroxide constituents. The intermediate composition formed thereby had a pH of about 13.2 or higher.

Soil binding and revegetation compositions suitable for vegetation or revegetation of denuded soil were made by adding 250–375 lbs. of a fibrous material to the intermediate composition. The fibrous material comprised a mixture of 40% thermally processed wood fibers and 60% recycled newsprint. The solid components exclusive of the added water and fibrous material had a combined concentration of about 1.8% by weight of the water.

The soil binding and revegetation compositions according to this example were found to better promote or facilitate the emergence of newly sprouted seeds or plants compared to compositions that only included recycled newsprint as the fibrous material, and they adhered better to soil compared to compositions that only included thermally processed wood fibers. Whereas compositions that contained only recycled newsprint formed a tight cap on the soil surface that inhibited the emergence of newly sprouted seeds and plants, adding thermally processed wood fibers was found to have broken and softened the resulting fibrous matrix sufficiently so that newly sprouted seeds and plants could more easily emerge through the treated soil. Conversely, while compositions that only included thermally treated wood fibers had a tendency to run off the soil, particularly when already wet, adding recycled newsprint was found to strength the matrix and promote better adhesion to soil.

Citric acid is optionally added to either the intermediate composition or soil binding and revegetation composition and mixed for 3–5 minutes in order to yield a final pH-adjusted soil binding and revegetation composition having a pH in a range of about 10–12.5.

EXAMPLE 2

Aqueous soil binding and revegetation compositions were manufactured by mixing together the following components:

| | |
|---|---|
| Endosperm (wheat flour) | 133.5 lbs. |
| Iron oxide ($Fe_2O_3$) | 0.67 lb. |
| Sodium Hydroxide | 34 lbs. |
| Potassium Hydroxide | 34 lbs. |
| Water | 8340 lbs. (1000 gallons) |
| Fibrous Material | 250–375 lbs. |

The endosperm and iron oxide were dry-mixed together for 3–5 minutes using a shear-type mixer in order to ensure more even dispersion of the iron oxide in the final composition. Thereafter, the endosperm and iron oxide mixture was added to a vessel containing the water (either fresh or brackish water) and mixed for 3–5 minutes using strong agitation in order to form a suspension of endosperm and iron oxide within the water.

Thereafter, the sodium hydroxide and potassium hydroxide were added to and mixed with the suspension for 3–5 minutes in order to react with and ionize the endosperm. The iron oxide may have also reacted or associated with the endosperm as a result of the water and hydroxide constituents. The intermediate composition formed thereby had a pH of about 13.2 or higher.

Soil binding and revegetation compositions suitable for vegetation or revegetation of denuded soil were made by adding 250–375 lbs. of a fibrous material to the intermediate composition. The fibrous material comprised a mixture of 40% thermally processed wood fibers and 60% recycled newsprint. The solid components exclusive of the added water and fibrous material had a combined concentration of about 2.4% by weight of the water.

The soil binding and revegetation compositions according to this example were found to better promote or facilitate the emergence of newly sprouted seeds or plants compared to compositions that only included recycled newsprint as the fibrous material, and they adhered better to soil compared to compositions that only included thermally processed wood fibers.

Citric acid is optionally added to either the intermediate composition or soil binding and revegetation composition and mixed for 3–5 minutes in order to yield a final pH-adjusted soil binding and revegetation composition having a pH in a range of about 10–12.5.

EXAMPLE 3

Aqueous soil binding and revegetation compositions were manufactured by mixing together the following components:

| | |
|---|---|
| Endosperm (wheat flour) | 150 lbs. |
| Iron oxide ($Fe_2O_3$) | 0.75 lb. |
| Sodium Hydroxide | 38 lbs. |
| Potassium Hydroxide | 38 lbs. |
| Water | 8340 lbs. (1000 gallons) |
| Fibrous Material | 250–375 lbs. |

The endosperm and iron oxide were dry-mixed together for 3–5 minutes using a shear-type mixer in order to ensure more even dispersion of the iron oxide in the final composition. Thereafter, the endosperm and iron oxide mixture was added to a vessel containing the water (either fresh or brackish water) and mixed for 3–5 minutes using strong agitation in order to form a suspension of endosperm and iron oxide within the water.

Thereafter, the sodium hydroxide and potassium hydroxide were added to and mixed with the suspension for 3–5 minutes in order to react with and ionize the endosperm. The iron oxide may have also reacted or associated with the endosperm as a result of the water and hydroxide constituents. The intermediate composition formed thereby had a pH of about 13.2 or higher.

Soil binding and revegetation compositions suitable for vegetation or revegetation of denuded soil were made by adding 250–375 lbs. of a fibrous material to the intermediate composition and mixing for 3–5 minutes. The fibrous material comprised a mixture of 40% thermally processed wood fibers and 60% recycled newsprint. The solid components exclusive of the added water and fibrous material had a combined concentration of about 2.7% by weight of the water.

The soil binding and revegetation compositions according to this example were found to better promote or facilitate the emergence of newly sprouted seeds or plants compared to compositions that only included recycled newsprint as the fibrous material, and they adhered better to soil compared to compositions that only included thermally processed wood fibers.

Citric acid is optionally added to either the intermediate composition or soil binding and revegetation composition and mixed for 3–5 minutes in order to yield a final pH-adjusted soil binding and revegetation composition having a pH in a range of about 10–12.5.

EXAMPLE 4

An intermediate composition suitable for use in manufacturing a soil binding and revegetation composition was manufactured by mixing together the following components:

| | |
|---|---|
| Endosperm (wheat flour) | 66 lbs. |
| Iron oxide ($Fe_2O_3$) | 0.38 lb. |
| Sodium Hydroxide | 33 lbs. |
| Water | 8340 lbs. (1000 gallons) |

The endosperm and iron oxide were dry-mixed together for 3–5 minutes using a shear-type mixer in order to ensure more even dispersion of the iron oxide in the final composition. Thereafter, the endosperm and iron oxide mixture was added to a vessel containing the water (either fresh or brackish water) and mixed for 3–5 minutes using strong agitation in order to form a suspension of endosperm and iron oxide within the water.

Thereafter, the sodium hydroxide and potassium hydroxide were added to and mixed with the suspension for 3–5 minutes in order to react with and ionize the endosperm. The iron oxide may have also reacted or associated with the endosperm as a result of the water and hydroxide constituents. The intermediate composition formed thereby had a pH of about 13.2 or higher. The non-aqueous components exclusive of the added water had a combined concentration of about 1.2% by weight of the water.

EXAMPLE 5

Soil binding and revegetation compositions suitable for vegetation or revegetation of denuded soil are made by adding 250–375 lbs. of a fibrous material to the intermediate composition of Example 4. The fibrous material comprises a mixture of 40% thermally processed wood fibers and 60% recycled newsprint.

The soil binding and revegetation compositions according to this example were found to better promote or facilitate the emergence of newly sprouted seeds or plants compared to compositions that only included recycled newsprint as the fibrous material, and they adhered better to soil compared to compositions that only included thermally processed wood fibers.

EXAMPLE 6

Sufficient citric acid is added to either the intermediate composition of Example 4 or the soil binding and revegetation composition of Example 5 in order to yield a final pH-adjusted intermediate composition or soil binding and revegetation composition having a pH in a range of about 10–12.

EXAMPLE 7

An intermediate composition suitable for use in manufacturing a soil binding and revegetation composition was manufactured by mixing together the following components:

| | |
|---|---|
| Endosperm (wheat flour) | 150 lbs. |
| Iron oxide ($Fe_2O_3$) | 0.75 lb. |
| Sodium Hydroxide | 75 lbs. |
| Water | 8340 lbs. (1000 gallons) |

The endosperm and iron oxide were dry-mixed together for 3–5 minutes using a shear-type mixer in order to ensure more even dispersion of the iron oxide in the final composition. Thereafter, the endosperm and iron oxide mixture was added to a vessel containing the water (either fresh or brackish water) and mixed for 3–5 minutes using strong agitation in order to form a suspension of endosperm and iron oxide within the water.

Thereafter, the sodium hydroxide and potassium hydroxide were added to and mixed with the suspension for 3–5 minutes in order to react with and ionize the endosperm. The iron oxide may have also reacted or associated with the endosperm as a result of the water and hydroxide constituents. The intermediate composition formed thereby had a pH of about 13.2 or higher. The non-aqueous components exclusive of the added water had a combined concentration of about 2.6% by weight of the water.

EXAMPLE 8

Soil binding and revegetation compositions suitable for vegetation or revegetation of denuded soil are made by adding 250–375 lbs. of a fibrous material to the intermediate composition of Example 7. The fibrous material comprises a mixture of 40% thermally processed wood fibers and 60% recycled newsprint.

The soil binding and revegetation compositions according to this example were found to better promote or facilitate the emergence of newly sprouted seeds or plants compared to compositions that only included recycled newsprint as the fibrous material, and they adhered better to soil compared to compositions that only included thermally processed wood fibers.

EXAMPLE 9

Sufficient citric acid is added to either the intermediate composition of Example 7 or the soil binding and revegetation composition of Example 8 in order to yield a final pH-adjusted intermediate composition or soil binding and revegetation composition having a pH in a range of about 10–12.

EXAMPLE 10

Any of the foregoing compositions is modified by using sulfamic acid as a pH adjustor, either alone or in combination with another pH adjustor.

EXAMPLE 11

Any of the foregoing compositions is modified by using sulfuric acid as a pH adjustor, either alone or in combination with another pH adjustor.

EXAMPLE 12

Any of the foregoing compositions is modified by adjusting the ratio of recycled newsprint to thermally processed wood fibers to other ratios between 1:20 and 20:1. Increasing the relative concentration of recycled newsprint results in a composition that has increased adhesion to soil and better water retention. Increasing the relative concentration of thermally processed wood fibers softens the fibrous material and promotes or facilitates the emergence of newly sprouted seeds or plants.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A soil binding and revegetation composition suitable for application to denuded soil so as to prevent or slow erosion of the soil, the composition comprising the mixture products of:
   a soil binding portion for binding soil particles together comprised of the mixture products of:
   a carbohydrate;
   a protein;
   an iron compound; and
   a strong base for increasing solubility of the carbohydrate and protein in water by making the composition strongly alkaline pH at least initially; and
   a soil revegetation portion comprised of:
   a fibrous material comprising at least two different types of fibers,
   one of the types of fibers that promote adhesion of the composition to soil, and
   another of the types of fibers that facilitate emergence of newly sprouted seeds or plants through the fibrous material when applied to soil.

2. A soil binding and revegetation composition as defined in claim 1, said further comprising water having a concentration in a range of about 60% to about 99.9% by weight of the composition.

3. A soil binding and revegetation composition as defined in claim 1, wherein said carbohydrate and said protein comprise at least one type of endosperm.

4. A soil binding and revegetation composition as defined in claim 3, wherein said endosperm is derived or extracted from at least one type of cereal grain or legume.

5. A soil binding and revegetation composition as defined in claim 4, wherein said endosperm is derived or extracted from at least one member selected from the group comprising wheat, rice, potatoes, corn, barley, sorghum, soy beans, and pinto beans.

6. A soil binding and revegetation composition as defined in claim 3, wherein said carbohydrate and protein of said endosperm are derived from a single source.

7. A soil binding and revegetation composition as defined in claim 3, wherein said carbohydrate and protein of said endosperm are derived from different sources.

8. A soil binding and revegetation composition as defined in claim 3, said endosperm having a concentration in a range of about 25% to about 95% by weight of solid components exclusive of said water.

9. A soil binding and revegetation composition as defined in claim 3, said endosperm having a concentration in a range of about 50% to about 85% by weight of solid components exclusive of said water.

10. A soil binding and revegetation composition as defined in claim 3, said endosperm having a concentration in a range of about 60% to about 75% by weight of solid components exclusive of said water.

11. A soil binding and revegetation composition as defined in claim 1, said iron compound comprising at least one type of iron oxide.

12. A soil binding and revegetation composition as defined in claim 1, said iron compound comprising at least one of ferric oxide, ferrous oxide, iron halide or iron hydroxide.

13. A soil binding and revegetation composition as defined in claim 1, said iron compound having a concentration in a range of about 0.01% to about 5% by weight of solid components in said composition.

14. A soil binding and revegetation composition as defined in claim 1, said iron compound having a concentration in a range of about 0.1% to about 1% by weight of solid components in said composition.

15. A soil binding and revegetation composition as defined in claim 1, said strong base comprising at least one member selected from the group comprising alkali metal oxides, alkaline earth metal oxides, alkali metal oxides, alkali metal hydroxides, and alkali metal carbonates.

16. A soil binding and revegetation composition as defined in claim 1, said strong base having a concentration in a range of about 15% to about 50% by weight of solid components in said composition.

17. A soil binding and revegetation composition as defined in claim 1, said strong base having a concentration in a range of about 25% to about 40% by weight of solid components in said composition.

18. A soil binding and revegetation composition as defined in claim 1, said fibers that promote adhesion of the composition to soil comprising a highly processed fiber having significant to substantial physical and structural breakdown of the fiber shaft, and said fibers that facilitate emergence of newly sprouted seeds or plants through the fibrous composition comprising a coarser fiber.

19. A soil binding and revegetation composition as defined in claim 18, said highly processed fiber comprising at least one of recycled paper, recycled newsprint, partially digested wood or plant fibers, chemically or pulped wood or plant fibers.

20. A soil binding and revegetation composition as defined in claim 18, said coarser fiber comprising at least one of thermally processed wood fibers, other wood fibers, staple fibers, synthetic fibers, or inorganic fibers.

21. A soil binding and revegetation composition as defined in claim 1, further comprising a pH adjustor in an amount so that the composition has a reduced pH in water in a range of about 9 to about 13.

22. A soil binding and revegetation composition as defined in claim 21, wherein said pH adjustor included in an amount so that the composition has a reduced pH in water in a range of about 10 to about 12.8.

23. A soil binding and revegetation composition as defined in claim 21, wherein said pH adjustor is included in an amount so that the composition has a reduced pH in water in a range of about 10.5 to about 12.6.

24. A soil binding and revegetation composition as defined in claim 21, said pH adjustor comprising at least one organic acid.

25. A soil binding and revegetation composition as defined in claim 24, said organic acid comprising at least one of citric acid, carbonic acid, formic acid, acetic acid, propanoic acid, benzoic acid, oxalic acid, glycolic acid, or ascorbic acid.

26. A soil binding and revegetation composition as defined in claim 1, further comprising at least one type of plant seeds.

27. A soil binding and revegetation composition as defined in claim 1, wherein said composition is a precursor composition to which water is added in order to yield a final composition for application to denuded soil.

28. A soil binding and revegetation composition as defined in claim 27, the precursor composition comprising at least two parts that are initially stored separately so that said two parts are individually mixable with water when manufacturing the final composition.

29. A soil binding and revegetation composition as defined in claim 1, further comprising water.

30. A soil binding and revegetation composition as defined in claim 28, a mixture of at least a portion of said endosperm, iron compound and strong base comprising a first part of the precursor composition and the fibrous material comprising a second part of the precursor composition.

31. A soil binding and revegetation composition as defined in claim 1, said fibers that promote adhesion of the composition to soil comprising at least one of recycled paper, recycled newsprint, partially digested wood or plant fibers, or chemically pulped wood or plant fibers.

32. A soil binding and revegetation composition as defined in claim 1, said fibers that facilitate emergence of newly sprouted seeds or plants comprising at least one of thermally processed wood fibers, other wood fibers, staple fibers, synthetic fibers, or inorganic fibers.

33. A soil binding and revegetation composition as defined in claim 27, further comprising a pH adjustor.

34. A method of manufacturing the soil binding and revegetation composition according to claim 29, comprising:
  mixing together said water, carbohydrates, protein, iron compound, and strong base to form an intermediate composition having a strongly alkaline pH; and
  adding said fibrous material to said intermediate composition so as to form the soil binding and revegetation composition.

35. A method as defined in claim 34, said fibers that promote adhesion of the composition to soil comprising at least one of recycled paper, recycled newsprint, partially digested wood or plant fibers, or chemically pulped wood or plant fibers.

36. A method as defined in claim 34, said fibers that facilitate emergence of newly sprouted seeds or plants comprising at least one of thermally processed wood fibers, other wood fibers, staple fibers, synthetic fibers, or inorganic fibers.

37. A method as defined in claim 34, further comprising adding a pH adjustor to the intermediate composition or soil binding and revegetation composition in order to reduce the pH of the intermediate or soil binding and revegetation composition to within a range of about 9 to about 13.

38. A method of treating soil so as to facilitate revegetation thereof, comprising:
  applying the soil binding and revegetation composition of claim 1 to soil; and
  allowing the soil binding and revegetation composition to bind particles found within the soil.

39. A method of treating soil as defined in claim 38, the soil binding and revegetation composition being applied by at least one of aerial spraying or broadcasting.

40. A method of treating soil as defined in claim 38, the soil binding and revegetation composition being applied by at least one of mechanical ground-based spraying or broadcasting.

41. A method of treating soil as defined in claim 38, the soil binding and revegetation composition being applied by at least one of manual spraying or broadcasting.

42. A method of treating soil as defined in claim 38, the soil binding and revegetation composition being applied to soil at a construction site in order to prevent erosion and promote revegetation of the soil.

43. A method of treating soil as defined in claim 38, the soil binding and revegetation composition being applied to at least one of soil or ash at a burn site in order to prevent erosion and promote revegetation of the soil.

44. A method of treating soil as defined in claim 38, the soil binding and revegetation composition being applied to denuded soil resulting from at least one of a land slide, an avalanche, or grading of land.

45. A method of treating soil as defined in claim 38, the soil binding and revegetation composition being applied to a powder resulting from at least one of the grinding of rock or other industrial or building operations or overburden and tailings from mining.

* * * * *

UNITED STATES PATENT AND TRADEMARK OFFICE
CERTIFICATE OF CORRECTION

PATENT NO. : 7,021,864 B2 Page 1 of 1
APPLICATION NO. : 10/767549
DATED : April 4, 2006
INVENTOR(S) : Maile et al.

It is certified that error appears in the above-identified patent and that said Letters Patent is hereby corrected as shown below:

Column 5
Line 67, change "present" to --presence--

Column 6
Line 11, change "causes" to --cause--
Line 56, change "and/the or" to --and/or the--

Column 7
Line 10, after "by weight of", remove "by weight of"

Column 9
Line 54, change "Examples," to --Examples--

Column 12
Line 61, change "strength" to --strengthen--

Column 17
Line 2, remove "said"

Column 19
Line 4, change "carbohydrates" to --carbohydrate--

Signed and Sealed this

Third Day of October, 2006

JON W. DUDAS
*Director of the United States Patent and Trademark Office*